United States Patent
Munshi

(10) Patent No.: US 6,956,570 B2
(45) Date of Patent: Oct. 18, 2005

(54) OBJECT VISIBILITY CONTROL FOR RAY TRACING

(75) Inventor: Aaftab A. Munshi, Los Gatos, CA (US)

(73) Assignee: Believe, Inc., Los Altos, CA (US)

( * ) Notice: Subject to any disclaimer, the term of this patent is extended or adjusted under 35 U.S.C. 154(b) by 59 days.

(21) Appl. No.: 09/894,225

(22) Filed: Jun. 27, 2001

(65) Prior Publication Data

US 2003/0001842 A1 Jan. 2, 2003

(51) Int. Cl.[7] ............................................. G06T 15/00
(52) U.S. Cl. ........................................ 345/426; 710/5
(58) Field of Search ................................. 345/156, 179, 345/419, 426, 505, 536, 810, 835, 427, 441, 584, 589, 615, 629; 710/5

(56) References Cited

U.S. PATENT DOCUMENTS

| 5,299,298 A | * | 3/1994 | Elmquist et al. ............. 345/421 |
| 5,317,689 A | * | 5/1994 | Nack et al. ..................... 710/5 |
| 5,603,053 A | * | 2/1997 | Gough et al. ................ 345/505 |
| 5,966,134 A | * | 10/1999 | Arias .......................... 345/589 |

OTHER PUBLICATIONS

DesignWorkshop User Guide, Artifice, Inc. 1998, sections 2.1, 2.6, 3.1.2, 3.1.7, 3.3.1, 3.3.2, 3.3.4, 4.1, 5.1.1.*
Buck et al., POV–Ray User's Guide, 1997, Chapters 2–4.*
Foley et al., Computer Graphics Principles and Practice Second Edition in C, 1997, Addison–Wesley Publishing Company, Chapters 15 and 16.*

* cited by examiner

Primary Examiner—Phu K. Nguyen
(74) Attorney, Agent, or Firm—Townsend and Townsend and Crew LLP

(57) ABSTRACT

A computer graphics method and apparatus allows designer control over the rendering of objects and scenes, in a rendering system using ray tracing for example. A modeling system is adapted to accept rules for controlling how certain objects affect the appearance of certain other objects. In a ray tracing implementation, rules are specified by ray type and can be specified as either "including" all but certain objects or "excluding" specific objects for any given object. A rendering system extracts these rules from a bytestream or other input including other graphics data and instructions, and populates lists for internal use by other components of the rendering system. A ray tracer in the rendering system is adapted to consult the list when performing ray tracing, so as to enforce the rendering control specified by the content creator when the objects and scene are rendered.

12 Claims, 4 Drawing Sheets

OBJECT VISIBILITY CONTROL FOR RAY TRACING

FIELD OF THE INVENTION

The present invention relates generally to computer graphics, and more particularly, to a method and apparatus for controlling rendering of objects and scenes using ray tracing techniques, for example.

BACKGROUND OF THE INVENTION

Computer graphics systems are important components in many applications, such as CAD/CAM, computer animation and gaming, visualization systems, flight simulators, special effects, medical imaging, architectural visualization, virtual reality, etc.

Computer graphics involves the design or modeling of objects and scenes to be displayed (typically 3-dimensional, but can be 2-dimensional), which models and designs are translated into data and instructions in computer-readable form. Computer graphics systems use these data and instructions, perhaps under the further stimulus of a user input through a joystick for example, to render these objects and scenes on a display for human perception.

During rendering, ray tracing techniques can be used to determine which of the modeled objects and/or portions thereof are to be included in a scene (perhaps from a perspective determined from a user input). Recursive ray tracing techniques can further determine how the appearance of some objects may be affected by the presence of other objects and light sources (e.g. shadows). Although typical computer graphics systems allow designers to specify how individual objects are to be displayed (e.g. lighting, special effects, textures, etc.), it may be desirable to allow a designer to further specify whether and how certain objects can affect the appearance of certain other objects. For example, a designer may wish to force one object not to be shadowed from another object, even though the other object may lie in a path between the first object and a specified light source. This presents a problem that has not been addressed by the prior art, including computer graphics systems employing a ray tracing rendering scheme.

SUMMARY OF THE INVENTION

The present invention relates to a computer graphics method and apparatus for controlling the rendering of objects and scenes, in a rendering system using ray tracing for example. A modeling system is adapted to accept rules for controlling how certain objects and/or light sources affect the appearance of certain other objects and/or lights. In a ray tracing implementation, rules are specified by ray type and can be specified as either "including" all but certain objects and/or lights or "excluding" specific objects and/or lights. A rendering system extracts these rules from a bytestream including other graphics data and instructions and populates lists for internal use by other components of the rendering system. A ray tracer in the rendering system is adapted to consult the list when performing ray tracing, so as to enforce the rendering control specified by the content creator when the objects and scene are rendered.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
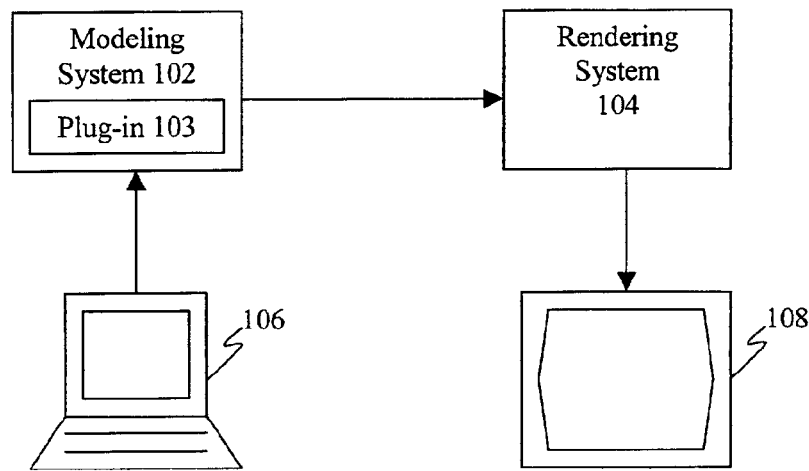
FIG. 1 is a top-level diagram illustrating an example computer graphics environment for an implementation of the present invention.

A top-level block diagram of an example implementation of the present invention is illustrated in FIG. 1.

As shown in FIG. 1, a computer graphics system includes a modeling system 102 and rendering system 104. Although shown separately for clarity, modeling system 102 and rendering system 104 can be implemented as software that is commonly executed by a common processor. Alternatively, modeling system 102 and rendering system 102 are implemented as hardware or software components that are separately provided in different platforms and communicate with each other via a bus, a network, or other communication means, using interprocess schemes such as client-server communications, for example. It should be apparent that many alternative topologies and implementations are possible.

Generally, modeling system 102 (e.g. Maya from Alias|Wavefront of Toronto, Ontario, Softimage|3D from Avid Technology, Inc. of Tewskbury, Mass. and 3D Studio Max from Discreet Logic, Inc. of Montreal, Quebec) allows a content creator/editor to model objects and specify how they are to be displayed in a scene (e.g. lighting, effects, material definitions) via GUI system 106. These models and instructions are sent by modeling system 102 to rendering system 104 to be displayed on a display 108 (which may be commonly or separately provided with GUI 106 system such as in a SGI Octane visual workstation, for example) or captured in an image file. In one example, particularly where autonomy between the modeling system 102 and rendering system 104 is desired, this transfer of graphics data and instructions is performed using an industry standard interface such as the RenderMan Interface (see, for example, the RenderMan Interface V3.1 description at www.pixar.com), or non-standard interfaces based thereon. In accordance with an aspect of the invention, modeling system 102 allows a content creator/editor to further specify relationships between modeled objects and/or rules concerning how they are allowed to affect each other's appearance, and rendering system 104 is adapted to consider these relationships and rules and to render scenes in accordance therewith.

The present invention contemplates the use or adaptation of various modeling systems and ways of specifying object relationships and rendering rules, and such are considered to be incidental to the invention. In one possible implementation, modeling system 102 can be based on the Maya modeling/animation system from Alias|Wavefront. In this example, as is known in the art, the Maya system includes an Application Programming Interface (API) which is an open architecture that includes the ability to provide additional graphics capability through plug-in applications. Accordingly, the present invention can be implemented by providing a plug-in application(s) 103 to the Maya API that allows content creators to specify object relationships and rules in addition to performing other modeling functions that are provided by Maya alone. Those skilled in the art will recognize various alternative implementations, whether or not including an environment such as Maya. Further, those skilled in the art will understand how to add the graphics capabilities of the present invention by adapting or creating other API's, plug-in applications 103 and the like after being taught about their functionality below.

Figure 2:
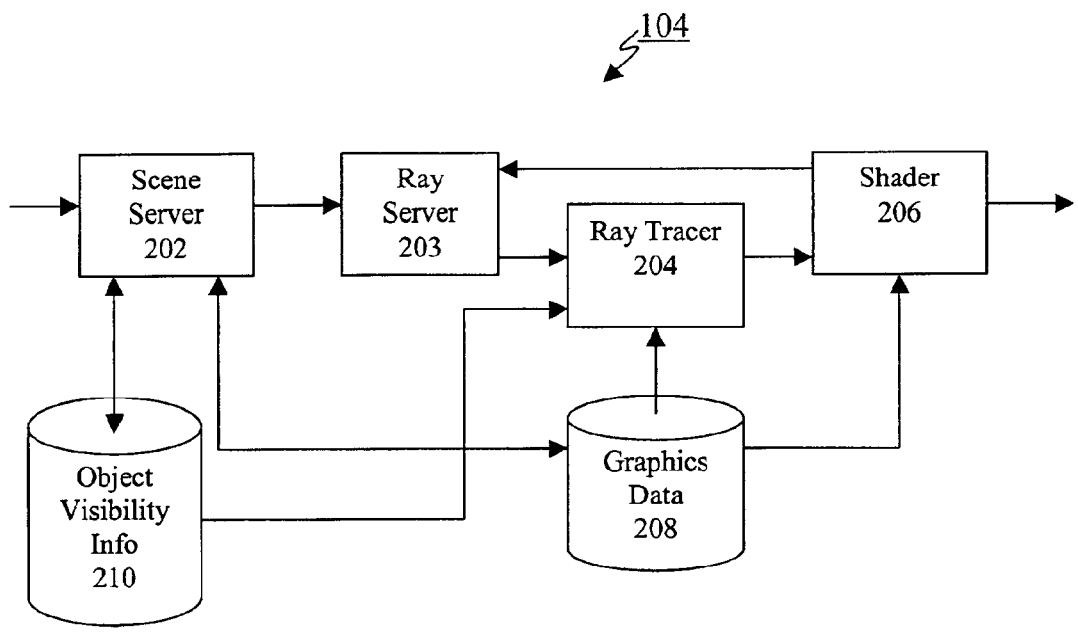
FIG. 2 is a functional block diagram illustrating an example implementation of a rendering system in accordance with the present invention.

FIG. 2 illustrates an example implementation of rendering system 104. As shown in FIG. 2, a rendering system 104 includes a scene server 202, a ray server 203, a ray tracer 204 and a shader 206. Scene server 202 receives a graphics input (e.g. a RenderMan Interface Bytestream (RIB)), and in response provides scene parameters to ray server 203 and establishes graphics data structures 208 (e.g. object descriptions, textures, surface shading programs, lights, etc.) for use by ray tracer 204 and shader 206. Of particular relevance to the present invention, as further shown in FIG. 2, scene server 202 can maintain object visibility relationships and rules 210.

It should be apparent that many other components, stores and graphics data and instructions can be included or processed in the rendering system 104, but these will not be illustrated or described so as not to obscure the invention. Moreover, it should be noted that scene server 202, ray server 203, ray tracer 204 and shader 206 are shown and described separately for clarity of the invention. However, it should be apparent that these components and the functionality performed by each as described herein can be consolidated and/or divided among fewer or additional components, including scene server 202, ray server 203, ray tracer 204 and shader 206. In one example implementation, ray tracer 204 and shader 206 are implemented together as multiple ASICs in a distributed computing architecture in which scene server 202 and ray server 203, implemented as software executing on one or more processors, act as hosts to divide a scene into multiple partitions and provide graphics data and instructions to individual ray tracer and shader ASICs respectively assigned to the partitions. However, it should be apparent that many alternative implementations and topologies are possible.

Generally, in operation, scene server 202 extracts object data from the graphics input, updates and/or maintains the appropriate graphics data in store 208, and provides image resolution parameters and camera information to ray server 203. In one example implementation, for a given scene or frame to be rendered, scene server 202 determines the center of projection and window on the view plane (i.e. the camera or eye view) of the scene and provides this information to ray server 203. Ray server 203 then causes ray tracer 204 and shader 206 (or respectively assigned circuits thereof) to compute the color of each pixel in the window. For example, for a given pixel (or for each subpixel in a pixel), ray server 203 determines the camera ray from the center of projection through the pixel, and instructs ray tracer 204 to determine objects hit by the ray. For certain implementations, ray tracer 204 may further generate rays that are spawned from the original ray (e.g. reflections, refractions and shadows). Given the objects hit by or shadowed from the original and subsidiary rays, as computed by ray tracer 204, shader 206 computes the color contributed by each object for that pixel, and may further generate additional rays to be processed. Those skilled in the art will understand how to implement or adapt a shader 206 that computes colors given the output of a ray tracer and other shading information, and so an even further detailed description thereof is unnecessary for an understanding of the present invention.

In accordance with an aspect of the invention, scene server 202 further extracts object visibility relationships and rules from the graphics input and maintains lists associated therewith in store 208. Ray tracer 204 can thus consider these relationships and rules when performing ray tracing processing, as will be described in more detail below.

Figure 3A:
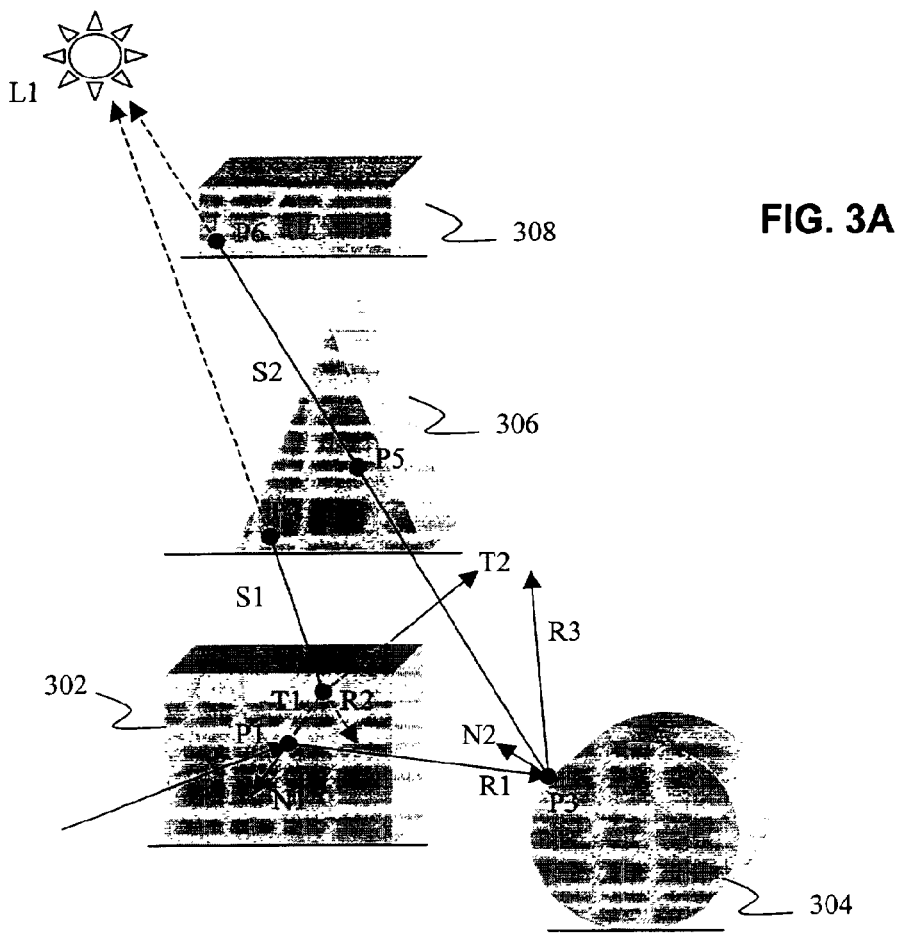
FIGS. 3A to 3C illustrate ray tracing processing of a scene with objects that demonstrates certain aspects of the present invention.
Figure 3B:
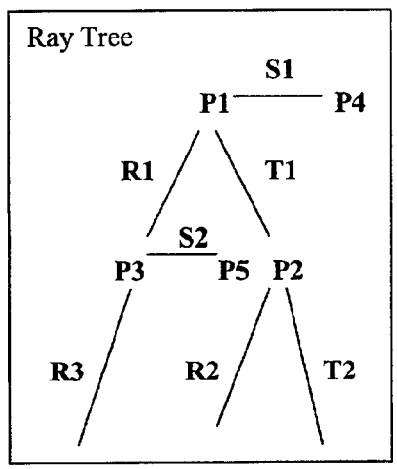
Figure 3C:
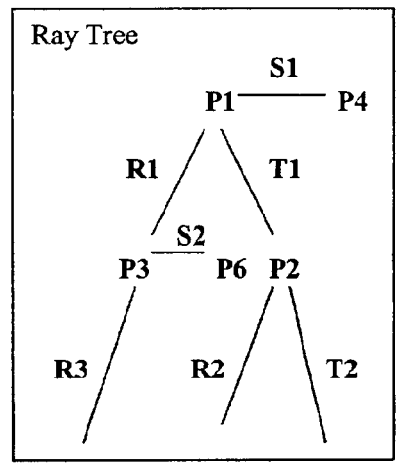

FIGS. 3A to 3C are directed to an example scene containing objects for rendering that illustrates certain aspects of the present invention.

As shown in FIG. 3A, a scene includes objects 302, 304, 306, and 308, and light L1 that potentially illuminates objects 302 and 304. In one example, a camera ray is projected into the scene and strikes object 302 at point P1 on a surface (a front facing surface in this example) at which there is a normal N1. Using recursive ray tracing techniques, at point P1, refracted ray T1 and reflected ray R1 are spawned. Refracted ray T1 continues through object 302 and strikes the back surface at point P2, at which point reflected ray R2 and refracted ray T2 are spawned. Reflected ray R1 strikes the surface of object 304 at point P3 having a normal N2 thereat. At point P3, reflected ray R3 is spawned.

As further shown in FIG. 3A, ray tracing processing will include determining any shadows at points P1, P2 and P3. Therefore, if light L1 is associated with objects 302 and 304, shadow rays S1 and S2 will be projected from points P1 and P3, respectively, toward L1 to determine the visibilities associated with each due to the presence of occluding objects. In this example, object 306 lies in the path of both S1 and S2, and so rays S1 and S2 would intersect object 306 at points P4 and P5, respectively. The complete ray tree for the above-described ray tracing is shown in FIG. 3B.

As discussed above, an aspect of the present invention includes the ability to control the visibility of certain objects and how certain objects and/or lights can affect the appearance of other objects and/or lights. As is clear from the example in FIG. 3A, the appearance of object 302 (at least at point P1) is affected by both objects 304 and 306. Suppose, however, that a content creator wished to create a special relationship between objects 304 and 306 such that no shadows will be cast on object 304 from object 306, for example. The creator would then specify a rule (using plug-in application 103 in modeling system 102, for example) that no shadow rays from object 304 striking object 306 are allowed (i.e., no shadows from object 306 should be cast on object 304). Rendering system 104, after considering the rule established by the content creator and included in the graphics input from the modeling system 102, would then disallow ray-object intersection processing between shadow ray S2 and object 306. As shown in FIG. 3A, shadow ray S2 projects on toward L1, and strikes object 308 at point P6. The ray tree after such rule processing is shown in FIG. 3C. When shading object 302 at point P1 due to the camera ray, therefore, the shader will arrive at the appropriate color by traversing the ray tree shown in FIG. 3C, which does not include the intersection of shadow ray S2 with object 306, rather than the original ray tree shown in FIG. 3B.

The present invention contemplates many types and combinations of object visibility rules that can be specified. For example, a designer can specify that an object should not be affected by reflected, refracted or shadow rays that intersect certain other objects or photon rays from certain light sources. Or, a designer can specify that an object should not be affected by reflected, refracted or shadow rays that intersect any other objects or photon rays that originate from any lights except for a designated set. Such rules can be generally specified in a format such as "<OBJID> exclude/include <RAYTYPE> <OBJLIST>," which indicates that when processing rays for the object specified by OBJID, exclude/include rays of RAYTYPE (e.g. reflected, refracted, shadow, camera, photon) that intersect the list of objects and/or lights specified by OBJLIST. Where a content creator wishes to exclude the effects of only a limited number of objects and/or lights on the display of other objects and/or lights, the "exclude" rule may be more efficient. Conversely, where the effects of all but a limited number of objects and/or lights are intended to be excluded, the use of the "include" rule may be more efficient. It will become apparent to those skilled in the art, after being taught by the present disclosure, that there are many variations in how object visibility rules may be specified, stored or processed to achieve substantially the same object visibility results in substantially the same way, and so the invention is not limited to the above described rule formats but rather embraces alternative embodiments exploiting such variations.

In one implementation, the object visibility rules are specified in a modeling system adapted in accordance with the invention. This can be done, for example, by including a plug-in application(s) 103 to an API included in the modeling system environment, which plug-in application allows the content creator to specify these rules in addition to performing other object modeling tasks. Along with other graphics data and instructions, the rules can be provided in an adapted RIB or other graphics stream to the rendering system 204. The rendering system can then extract these rules from the bytestream for processing in accordance with the present invention. It should be noted, however, that there can be other ways to specify and receive the object visibility rules in addition to, or in place of, a modeling system, and so the present invention is not limited thereby.

Figure 4:
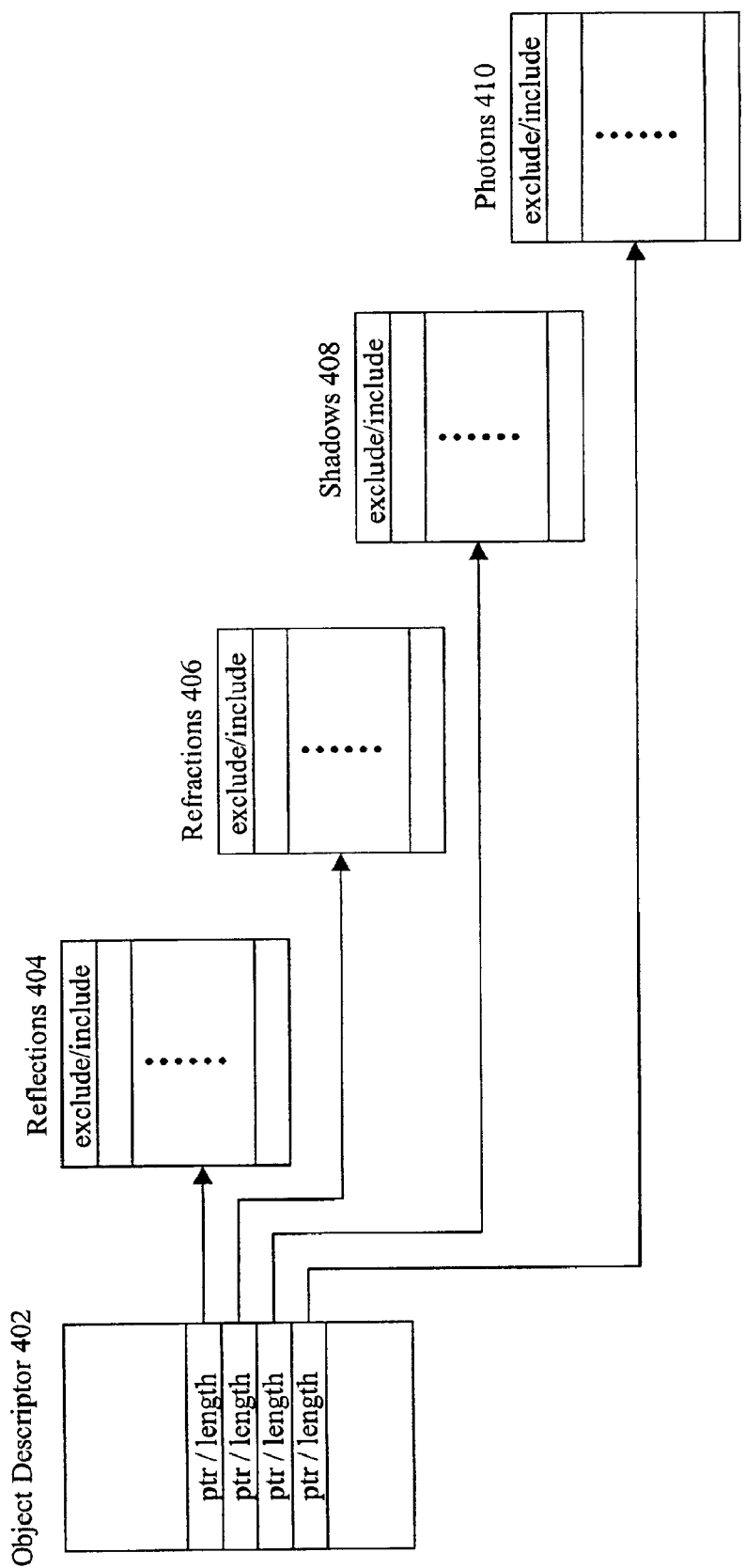
FIG. 4 is an example of data structures that can be used to implement the rules for controlling rendering in accordance with an aspect of the present invention.

When processing the RIB or other graphics input from the modeling system, the rendering system can create and/or populate data structures such as those illustrated in FIG. 4 for internal use by other components of the rendering system. As can be seen in this example, these structures are a linked set of lists. Particularly, object descriptor 402 includes pointers to lists of objects for various forward and backward ray types such as reflected rays 404, refracted rays 406, shadow rays 408 and photon rays 410. Along with the pointer there may be stored an indication of the number of objects stored in the respective list 404, 406, 408, 410. Accordingly, when a ray tracer such as ray tracer 204 is processing rays from a point of intersection on an object or from a light source, it will consult object descriptor 402. Thus, when a reflected ray is spawned from the point of intersection on an object, for example, the ray tracer will determine whether any objects are stored in reflections list 404 for the intersected object (e.g. if the number/length of the list is nonzero as specified in object descriptor 402), and if so, it will ignore any intersections of the spawned reflected ray with objects listed in list 404 (or ignore intersections for all but the listed objects if list 404 specifies an "include" rule).

It should be apparent that the types of rays that can be included for special processing in accordance with the invention is not limited in number or type to the specific types of rays listed above, but may include fewer or additional types of rays, whether specifically mentioned in the list of ray types provided herein or not. It should be further apparent that additional object information may be stored and considered for object rendering beyond that illustrated in FIG. 4, and that object descriptor 402 may be included in, or separate from, such further information.

Figure 5:
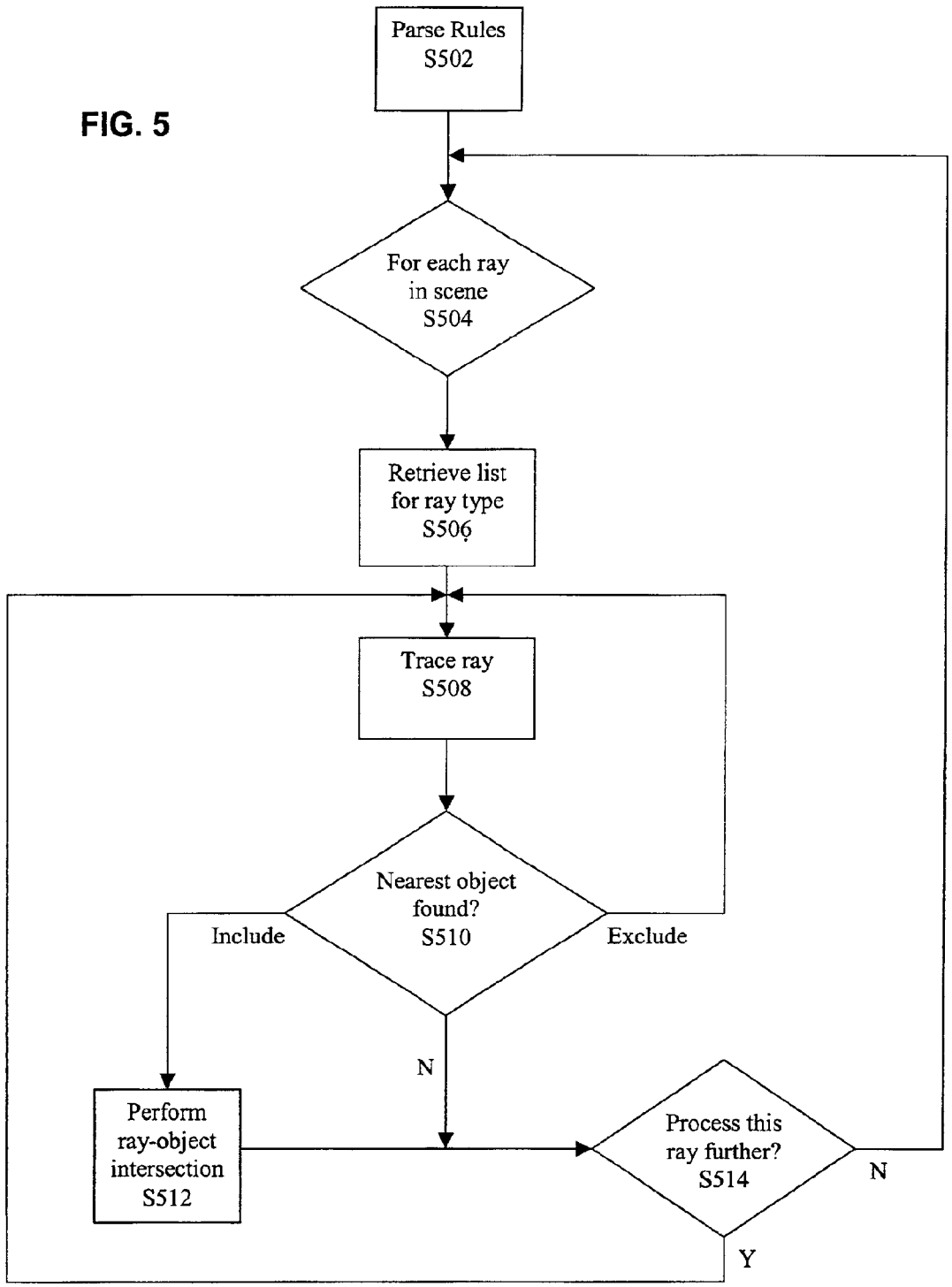
FIG. 5 is a flowchart illustrating an example method implemented in accordance with the principles of the present invention.

An example method for controlling the appearance of objects rendered in a scene that can be executed by a graphics system in accordance with an aspect of the present invention is illustrated by the flowchart in FIG. 5.

As shown in FIG. 5, the rules received from the modeling system are parsed and are used to populate the include/exclude lists such as those illustrated in FIG. 4 (S502). For each ray of a scene or frame to be rendered (determined in step S504), therefore, the list of object visibility rules for the object or light source from which the ray is projecting is retrieved (S506). Regardless of the type of ray that is being projected from the point of intersection with the object (e.g. reflected, refracted, shadow, etc.), the ray tracer begins to trace the ray from a point of intersection or light source (S508). The nearest object struck by the ray is then compared to the list of rules specified for the originating object or light source and the ray type (S510). If the struck object is specified in the list, and is associated with an "include" rule, or if the object is not specified in the list, normal ray-object intersection processing with the object will be performed (S512). This may include, for example, determining a point of intersection on the object, and spawning other rays from the point of intersection. Otherwise, the object is specified in the list and is associated with an "exclude" rule. Accordingly, it should be excluded from ray-object intersection processing and is skipped (see "Exclude" arrow back to step S508). Finally, it is determined whether any additional tracing for this ray should be performed (S514). If so, processing returns to step S508. Otherwise, processing returns to step S504.

Although not shown, it should be understood that when a ray tree is completed or as it is generated, it can be provided to a shader such as shader 206 for determining the color associated with the original ray-object intersection corresponding to the ray tree. For example, if the ray tree is constructed for a camera or eye ray associated with a pixel, the shader will compute the color for the pixel by traversing the ray tree as constructed by the ray tracer in accordance with a method such as that described above. It should be further understood that the processing of the ray tree need not sequentially follow completion of the construction of the ray tree, but that certain shading operations may be performed in parallel with certain ray tracing operations. Moreover, it should be apparent that the shader may process certain rays (e.g. shadow rays) separately from ray trees. Those skilled in the art will understand the various implementation alternatives and the present invention embraces corresponding alternative embodiments. Furthermore, it should be understood that additional rendering and ray tracing operations may be performed in conjunction with or in addition to the above-described processing, such as computing intersection points and determining opacities and the like.

It should be further noted that the above described method does not include detailed descriptions of other ray tracing, rendering and shading operations that may be performed in conjunction with or in addition to the processing described above. Details of such other operations are omitted here so as not to obscure the invention. Moreover, the invention is not limited to any specific sequence or implementation of such additional operations.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A graphics apparatus, comprising:
    a rendering system that renders an object in response to a graphics input, the graphics input including object visibility rules, the rendering system constraining the rendering of the object in accordance with the object visibility rules, wherein the object visibility rules allow a graphics designer to control how certain objects or lights, or both, affect the appearance of other objects or lights, or both,
    wherein a rendering system includes a ray tracer, the object visibility rules specifying a relationship between light sources and certain rays, the ray tracer looking up a rule associated with one of the light sources when processing the certain rays for the light source.

2. A graphics apparatus according to claim 1, wherein the certain rays include rays originating from the light source and potentially intersecting the object.

3. A graphics apparatus, comprising:
    a rendering system that renders an object in response to a graphics input, the graphics input including object visibility rules, the rendering system constraining the rendering of the object in accordance with the object visibility rules, wherein the object visibility rules allow a graphics designer to control how certain objects or lights, or both, affect the appearance of other objects or lights, or both,
    wherein the rendering system includes a ray tracer, the object visibility rules specifying a relationship between the object and certain rays, the ray tracer looking up a rule associated with the object when processing the certain rays for the object, and
    wherein the ray tracer constructs a ray tree associated with the object in accordance with the object visibility rules.

4. A plug-in application for a modeling system that constructs object visibility rules in response to user input, the object visibility rules being supplied to a rendering system in a graphics input from the modeling system, the rendering system rendering an object in response to the graphics input, the rendering system constraining the rendering of the object in accordance with the object visibility rules, wherein the object visibility rules allow a graphics designer to control how certain objects or lights, or both, affect the appearance of other objects or lights, or both,
    wherein the rendering system includes a ray tracer, the object visibility rules specifying a relationship between light sources and certain rays, the ray tracer looking up a rule associated with one of the light sources when processing the certain rays for the light source.

5. A plug-in application according to claim 4, wherein the certain rays include rays originating from the light source and potentially intersecting the object.

6. A plug-in application for a modeling system that constructs object visibility rules in response to user input, the object visibility rules being supplied to a rendering system in a graphics input from the modeling system, the rendering system rendering an object in response to the graphics input, the rendering system constraining the rendering of the object in accordance with the object visibility rules, wherein the object visibility rules allow a graphics designer to control how certain objects or lights, or both, affect the appearance of other objects or lights, or both,
    wherein the ray tracer constructs a ray tree associated with the object in accordance with the object visibility rules.

7. A graphics apparatus comprising:
    a scene server that receives a graphics input specifying a plurality of objects and extracts object visibility rules from the graphics input; and
    a ray tracer coupled to the scene server that determines intersections of rays with
    certain of the plurality of objects included in a scene, the ray tracer receiving the object visibility rules and constraining the ray intersection determination in accordance therewith, wherein the object visibility rules allow a graphics designer to control how certain objects or lights, or both, affect the appearance of other objects or lights, or both,
    wherein the ray tracer constructs ray trees associated with the certain objects and the intersections, the ray tracer constraining objects to be included in the ray trees in accordance with the object visibility rules.

8. A graphics apparatus according to claim 7, further comprising a shader coupled to the ray tracer for determining colors associated with the ray trees.

9. A graphics apparatus comprising:
    means for receiving a graphics input specifying a plurality of objects;
    means for extracting object visibility rules from the graphics input; and
    means for determining intersections of rays with certain of the plurality of objects in a scene, the determining means including means for receiving the object visibility rules and means for constraining the ray intersection determination in accordance therewith, wherein the object visibility rules allow a graphics designer to control how certain objects or lights, or both, affect the appearance of other objects or lights, or both,
    wherein the determining means further includes means for constructing ray trees associated with the certain objects and the intersections, the constraining means constraining objects included in the ray trees in accordance with the object visibility rules.

10. A graphics apparatus according to claim 9, further comprising means for determining colors associated with the ray trees.

11. A graphics method comprising:
    receiving a graphics input specifying a plurality of objects;

extracting object visibility rules from the graphics input; and determining intersections of rays with certain of the plurality of objects in a scene, the determining step including receiving the object visibility rules and constraining the ray intersection determination in accordance therewith, wherein the object visibility rules allow a graphics designer to control how certain objects or lights, or both, affect the appearance of other objects or lights, or both, wherein the determining step further includes constructing ray trees associated with the certain objects and the intersections, the constraining step including constraining objects included in the ray trees in accordance with the object visibility rules.

12. A graphics apparatus according to claim 11, further comprising determining colors associated with the ray trees.

* * * * *